(12) United States Patent
Lee et al.

(10) Patent No.: US 7,572,471 B2
(45) Date of Patent: Aug. 11, 2009

(54) METHOD TO IMPROVE THE STABILITY OF LEMON/LIME FLAVORED BEVERAGES

(75) Inventors: Thomas Lee, Scarsdale, NY (US); Pei Chang, Cortlandt Manor, NY (US); Zena Bell, Hartsdale, NY (US)

(73) Assignee: PepsiCo, Inc., Purchase, NY (US)

( * ) Notice: Subject to any disclaimer, the term of this patent is extended or adjusted under 35 U.S.C. 154(b) by 440 days.

(21) Appl. No.: 10/628,420

(22) Filed: Jul. 29, 2003

(65) Prior Publication Data

US 2004/0022921 A1    Feb. 5, 2004

Related U.S. Application Data

(60) Provisional application No. 60/398,790, filed on Jul. 29, 2002.

(51) Int. Cl.
*A23L 2/00* (2006.01)

(52) U.S. Cl. .................. 426/330.3; 426/650

(58) Field of Classification Search .......... 426/330.3, 426/330.5, 590, 650, 651, 531
See application file for complete search history.

(56) References Cited

U.S. PATENT DOCUMENTS

| | | | | |
|---|---|---|---|---|
| 3,245,798 A | * | 4/1966 | Van Ness | 426/96 |
| 3,413,125 A | * | 11/1968 | Schuppner, Jr. | 426/548 |
| 3,416,930 A | * | 12/1968 | Irani | 426/576 |
| 4,551,342 A | | 11/1985 | Nakel et al. | 426/548 |
| 4,612,205 A | | 9/1986 | Kupper et al. | 426/599 |
| 4,722,847 A | | 2/1988 | Heckert | 426/74 |
| 4,737,375 A | | 4/1988 | Nakel et al. | 426/590 |
| 4,740,380 A | | 4/1988 | Melachouris et al. | 426/590 |
| 4,746,527 A | * | 5/1988 | Kuypers | 426/569 |
| 4,830,862 A | * | 5/1989 | Braun et al. | 426/74 |
| 4,871,554 A | * | 10/1989 | Kalala et al. | 426/74 |
| 4,919,963 A | | 4/1990 | Heckert | 426/599 |
| 5,032,411 A | * | 7/1991 | Stray-Gundersen | 426/74 |
| 5,114,723 A | | 5/1992 | Stray-Gundersen | 426/74 |
| 5,219,598 A | | 6/1993 | Anderson et al. | 426/96 |
| 5,310,570 A | | 5/1994 | Kwapong et al. | 426/590 |
| 5,348,756 A | | 9/1994 | Lee et al. | 426/576 |
| 5,472,716 A | | 12/1995 | Kwapong et al. | 426/2 |
| 5,817,351 A | * | 10/1998 | DeWille et al. | 426/74 |
| 5,866,190 A | * | 2/1999 | Barey | 426/573 |
| 5,976,602 A | | 11/1999 | Baron et al. | 426/548 |
| 6,068,869 A | | 5/2000 | Bent Ginslov | 426/262 |
| 2002/0102331 A1 | | 8/2002 | Chang et al. | 426/74 |
| 2003/0021878 A1 | | 1/2003 | Nunes et al. | 426/601 |
| 2003/0035880 A1 | | 2/2003 | Heisey et al. | 426/601 |

FOREIGN PATENT DOCUMENTS

| | | |
|---|---|---|
| EP | 0 244 903 | 11/1987 |
| GB | 2 207 335 | 2/1989 |
| WO | WO 98/58656 | 12/1998 |
| WO | 02/32236 | 4/2002 |
| WO | 03/003849 | 1/2003 |
| WO | 03/003850 | 1/2003 |

OTHER PUBLICATIONS

Lange's Handbook of Chemistry (15th Edition), 1999, McGraw-Hill, 4 pages and Title details.*
Dictionary of Food Ingredients (4th edition), 2001, Springer-Verlag, pp. 35, 86 and 138.*
Prager, Jan C. (1998). Environmental Contaminant Reference Databook, vols. 1-3. John Wiley & Sons, pp. 1-6 Adipic Acid.*
E.J. Freeburg, et al., "Stability of Citral-Containing and Citralless Lemon Oils in Flavor Emulsions and Beverages", Perfumer & Flavorist, vol. 19, pp. 23-32 (1994).

* cited by examiner

*Primary Examiner*—Jennifer McNeil
*Assistant Examiner*—Jyoti Chawla
(74) *Attorney, Agent, or Firm*—Banner & Witcoff, Ltd.

(57) ABSTRACT

A combination of an acidulant system and a buffer salt system is included in lemon/lime flavored beverages to achieve improved stability. The acidulant system includes citric acid and/or phosphoric acid and an additional organic acid having a smaller dissociation constant than both phosphoric acid and citric acid; the buffer salt system includes a citrate salt and a phosphate salt.

17 Claims, No Drawings

US 7,572,471 B2

METHOD TO IMPROVE THE STABILITY OF LEMON/LIME FLAVORED BEVERAGES

This application claims the benefit of U.S. Provisional Application No. 60/398,790, filed Jul. 29, 2002.

BACKGROUND OF THE INVENTION

1. Field of the Invention

This invention relates to the combined use of an acidulant system and a buffer salt system to increase the stability of lemon/lime flavored beverages. This invention further relates to lemon/lime flavored beverages which include such acidulant and buffer salt systems.

2. Related Background Art

Lemon/lime flavored beverages are very popular throughout the world. Such beverages may be carbonated or non-carbonated and may or may not contain juice. For example, 7-Up® is a well known lemon/lime flavored carbonated soft drink. In addition, lemon/lime flavored cola beverages are currently very fashionable. Further, other types of lemon/lime flavored beverages such as sports drinks are enjoyed on a worldwide basis.

Conventionally, lemon/lime flavored beverages are formulated to a relatively low pH in order to produce a desired level of tartness or sourness, a taste attribute which is key for lemon/lime flavored beverages. However, at such a low pH, lemon/lime flavor is not stable for extended periods of time. In fact, key ingredients of lemon/lime flavor degrade under such acidic conditions, thereby causing diminished flavor and off-tastes.

Lemon/lime flavor does become more stable at higher pHs, Freeburg, et al., *Perfumer & Flavorist*, vol. 19, pp. 23-32 (1994), and it is within the skill of one of ordinary skill in this art to raise the pH of a beverage formulation by increasing buffering salts and/or reducing acids. Unfortunately though, at higher pH levels, the perception of tartness or sourness of a beverage is unacceptably compromised. Hence, it is difficult to produce a lemon/lime flavored beverage with a good shelf life.

In addition to the problems associated with shelf life, the instability of lemon/lime flavor at lower pHs limits the applications to which lemon/lime flavor can be applied. For example, cola beverages are typically formulated to a pH of about 2.5 to 2.8 using two acidulants, namely phosphoric acid and citric acid, and sodium or potassium citrate as a buffering salt. Due to the low pH, it is not possible to make a good tasting, storage-stable lemon/lime flavored cola drink by simply adding lemon/lime flavor to such a conventionally formulated cola drink since the lemon/lime flavor will degrade and compromise the overall flavor of the cola.

U.S. Pat. No. 5,348,756 addresses a similar problem regarding gelatin gels. Therein, a higher pH was desirable in terms of reducing the gelatin load necessary to obtain a desired gel strength, yet a higher pH typically reduced the desired sour taste and/or produced off-tastes. According to U.S. Pat. No. 5,348,756, a combination of (1) adipic acid, (2) fumaric acid and/or citric acid, (3) phosphate salts and (4) citrate salts was used to formulate a gelatin gel having a pH of about 4.15 to 4.5 which exhibited a desired gel strength and taste and which required a lower gelatin load. U.S. Pat. No. 5,348,756 relates to gelatin gels and powdered mixes therefor only.

Hence, there exists a dilemma in the formulation of lemon/lime flavored beverages. There are competing interests (1) to raise the pH significantly to improve the stability of lemon/lime flavor and (2) to maintain or increase the tartness perception commonly associated with the lemon/lime flavor. In short, there is a need for good tasting, storage-stable lemon/lime flavored beverages.

SUMMARY OF THE INVENTION

This invention is directed to a method of improving the stability of a lemon/lime flavored beverage comprising the steps of (a) including in the lemon/lime flavored beverage an acidulant system consisting of (i) citric acid or a combination of phosphoric acid and citric acid and (ii) an organic acid having a smaller dissociation constant than both phosphoric acid and citric acid; and (b) including in the lemon/lime flavored beverage a buffer salt system consisting of a citrate salt and a phosphate salt.

According to the present invention, the organic acid is selected from adipic acid, succinic acid, glutaric acid and combinations thereof. In certain preferred embodiments wherein a combination of phosphoric acid and citric acid is used with an organic acid, the ratio of the organic acid: phosphoric acid:citric acid is 3.0-4.0:1.4-2.0:1.0, preferably 3.3-3.7:1.6-1.8:1.0. In other preferred embodiments wherein citric acid alone is used with an organic acid, the ratio of the organic acid:citric acid is 1:15 to 1:3, preferably 1:10 to 1:4.

In still other preferred embodiments of the present invention, the citrate salt and the phosphate salt are independently selected from sodium, potassium and calcium salts and from mono-, di- and tri-ionic salts. The ratio of citrate salt:phosphate salt is from 1:2 to 2:1, preferably 1:1.

A preferred embodiment of the present invention is directed to improving the stability of a lemon/lime flavored cola beverage or a lemon/lime flavored carbonated soft drink.

This invention is further directed to a stable lemon/lime flavored beverage comprising (a) an acidulant system consisting of (i) citric acid or a combination of phosphoric acid and citric acid and (ii) an organic acid having a smaller dissociation constant than both phosphoric acid and citric acid; and (b) a buffer salt system consisting of a citrate salt and a phosphate salt.

DETAILED DESCRIPTION

As used herein, "beverage" refers to, without limitation, carbonated soft drinks, fountain beverages, frozen ready-to-drink beverages, coffee beverages, tea beverages and liquid concentrates, sports drinks and alcoholic products; the beverage may be carbonated or noncarbonated.

The present invention is first directed to a method of improving the stability of lemon/lime flavored beverages. According to the present invention, it is possible to achieve both a higher pH level in order to improve the stability of lemon/lime flavor and a maintained or increased level of tartness. Through the combined use of an acidulant system and a buffer salt system, the stability of lemon/lime flavored beverages is unexpectedly and advantageously improved.

Therefore, the first embodiment of the present invention is directed to a method of improving the stability of a lemon/lime flavored beverage comprising the steps of (a) including in the lemon/lime flavored beverage an acidulant system consisting of (i) citric acid or a combination of phosphoric acid and citric acid and (ii) an organic acid having a smaller dissociation constant than both phosphoric acid and citric acid; and (b) including in the lemon/lime flavored beverage a buffer salt system consisting of a citrate salt and a phosphate salt.

According to the present invention, the acidulant system includes (i) citric acid (pK1=3.14) or a combination of phosphoric acid (pK1=2.15) and citric acid and (ii) an organic acid having a smaller dissociation constant than both phosphoric acid and citric acid.

Both phosphoric acid and citric acid are typically present in cola drinks and many other beverages. The organic acid can be any organic acid having a smaller dissociation constant (that is, smaller Ka or larger pKa as pKa=−log Ka) than both phosphoric acid and citric acid. Suitable organic acids include, without limitation, adipic acid (pK1=4.43), succinic acid (pK1=4.16), glutaric acid (pK1=4.34) and combinations thereof.

According to one embodiment of the present invention, citric acid alone is used in combination with the organic acid. In order to achieve the desired effects of the present invention, i.e., improve the stability of lemon/lime flavor, citric acid and the organic acid are present in a lemon/lime flavored beverage such that the ratio of organic acid; citric acid is from 1:15 to 1:3, preferably 1:10 to 1:4.

According to another embodiment of the present invention, a combination of phosphoric acid and citric acid is used in combination with the organic acid. In order to achieve the desired effects of the present invention, i.e., improve the stability of lemon/lime flavor, citric acid, phosphoric acid and the organic acid are present in a lemon/lime flavored beverage such that the ratio of organic acid:phosphoric acid:citric acid is from 3.0-4.0:1.4-2.0:1.0., preferably 3.3-3.7:1.6-1.8:1.0.

Accordingly, in a finished lemon/lime flavored beverage, citric acid is typically present in a concentration from about 0.18-0.24%, preferably 0.19-0.23%, by weight based on finished lemon/lime flavored beverage.

According to the present invention, the buffer salt system includes a citrate salt and a phosphate salt. The salts can be sodium, potassium and/or calcium salts and can be mono-, di- or tri-ionic salts.

In order to achieve the desired effects of the present invention, i.e., improve the stability of lemon/lime flavor, citrate and phosphate salts are present in a lemon/lime flavored beverage such that the ratio of citrate; phosphate is from 1:2 to 2:1, preferably about 1:1.

Typically, the salts are present in a combined amount from about 0.04-0.18%, preferably 0.05-0.15%, based on finished lemon/lime flavored beverage weight, when citric acid alone is used in combination with the organic acid. Typically, the salts are present in a combined amount from about 0.25-0.41%, preferably 0.3-0.36%, based on finished lemon/lime flavored beverage weight, when a combination of phosphoric acid and citric acid is used in combination with the organic acid.

Another embodiment of the present invention is directed to a stable lemon/lime flavored beverage comprising (a) an acidulant system consisting of (i) citric acid or a combination of phosphoric acid and citric acid and (ii) an organic acid having a smaller dissociation constant than either phosphoric acid or citric acid; and (b) a buffer salt system consisting of a citrate salt and a phosphate salt.

The stable lemon/lime flavored beverages of the present invention typically have a pH in the range of about 3.2-3.8. By the method of the present invention, it is possible to increase pH up to about 0.7 pH units.

The examples which follow are intended as an illustration of certain preferred embodiments of the invention, and no limitation of the invention is implied.

EXAMPLE 1

A 1-liter syrup for use in making a finished lemon/lime flavored cola drink was prepared. The ingredients listed in Table 1 were combined as follows:

TABLE 1

| ingredient | (g) |
| --- | --- |
| sucrose | 656.0 |
| potassium benzoate | 1.68 |
| potassium citrate | 2.0 |
| disodium phosphate | 2.0 |
| citric acid | 1.3 |
| adipic acid | 4.5 |
| phosphoric acid | 2.2 |
| cola flavors | 15.0 |
| lemon flavors | 12.0 |
| purified water | Q.S. 1 L |

Sucrose was dissolved in about 0.35 L water with vigorous stirring. To the sucrose solution, a water solution of benzoate, citrate and phosphate was added. This was followed by phosphoric acid, citric acid and a warm water solution of adipic acid. Flavors were added, and the volume of the syrup was adjusted to 1 L by adding water. The syrup thus made was mixed with carbonated water in a one part syrup with 5 parts carbonated water to become finished lemon/lime flavored cola drinks. The finished lemon/lime flavored cola drinks had a pH of 3.43.

EXAMPLE 2

A 1-liter syrup for use in making a finished lemon/lime flavored carbonated soft drink was prepared. The ingredients listed in Table 2 were combined as follows:

TABLE 2

| ingredient | (g) |
| --- | --- |
| sodium benzoate | 2.122 |
| sucrose | 617.0 |
| flavor | 5.7 |
| lemon juice* | 38.75 |
| adipic acid | 1.2 |
| sodium citrate | 2.0 |
| disodium phosphate | 2.0 |
| purified water | Q.S. 1 L |

*Juice specification stipulates a target of 32% citric acid; this equals 12.4 g citric acid.

Sucrose was dissolved in about 0.35 L water with vigorous stirring. To the sucrose solution, a water solution of benzoate, citrate and phosphate was added. This was followed by juice and a warm water solution of adipic acid. Flavor was added, and the volume of the syrup was adjusted to 1 L by adding water. The syrup thus made was mixed with carbonated water in a one part syrup with 5 parts carbonated water to become finished lemon/lime flavored carbonated soft drinks. The finished drinks had a pH of 3.55 and a titratable acidity of 33.86.

EXAMPLE 3

A 1-liter syrup for use in making a finished lemon/lime flavored carbonated soft drink was prepared. The ingredients listed in Table 3 were combined as follows:

TABLE 3

| ingredient | (g) |
| --- | --- |
| sodium benzoate | 2.122 |
| sucrose | 617.0 |
| flavor | 5.7 |
| lemon juice* | 38.75 |
| adipic acid | 3.0 |
| sodium citrate | 3.5 |
| disodium phosphate | 3.5 |
| purified water | Q.S. 1 L |

*Juice specification stipulates a target of 32% citric acid; this equals 12.4 g citric acid.

Sucrose was dissolved in about 0.35 L water with vigorous stirring. To the sucrose solution, a water solution of benzoate, citrate and phosphate was added. This was followed by juice and a warm water solution of adipic acid. Flavor was added, and the volume of the syrup was adjusted to 1 L by adding water. The syrup thus made was mixed with carbonated water in a one part syrup with 5 parts carbonated water to become finished lemon/lime flavored carbonated soft drinks. The finished drinks had a pH of 3.75 and a titratable acidity of 38.05.

COMPARATIVE EXAMPLE 1

A 1-liter syrup for use in making a finished lemon/lime flavored cola drink was prepared. The ingredients listed in Table 4 were combined as follows:

TABLE 4

| ingredient | (g) |
| --- | --- |
| sucrose | 656.0 |
| potassium benzoate | 1.68 |
| potassium citrate | 1.02 |
| citric acid | 1.75 |
| phosphoric acid | 2.2 |
| cola flavors | 15.0 |
| lemon flavors | 12.0 |
| purified water | Q.S. 1 L |

Sucrose was dissolved in about 0.35 L water with vigorous stirring. To the sugar solution, a water solution of benzoate and citrate was added. This was followed by phosphoric acid and citric acid. Flavors were added, and the volume of the syrup was adjusted to 1 L by water. The syrup thus made was mixed with carbonated water in a one part syrup with 5 parts carbonated water to become finished cola drinks. The finished cola drinks had a pH of 2.74.

COMPARATIVE EXAMPLE 2

A 1-liter syrup for use in making a finished lemon/lime flavored carbonated soft drink was prepared. The ingredients listed in Table 5 were combined as follows:

TABLE 5

| ingredient | (g) |
| --- | --- |
| sodium benzoate | 2.122 |
| sucrose | 617.0 |
| flavor | 5.7 |
| lemon juice* | 38.75 |
| purified water | Q.S. 1 L |

*Juice specification stipulates a target of 32% citric acid; this equals 12.4 g citric acid.

Sucrose was dissolved in about 0.35 L water with vigorous stirring. To the sucrose solution, a water solution of benzoate was added. This was followed by juice and flavor, and the volume of the syrup was adjusted to 1 L by adding water. The syrup thus made was mixed with carbonated water in a one part syrup with 5 parts carbonated water to become finished lemon/lime flavored carbonated soft drinks. The finished drinks had a pH of 3.02 and a titratable acidity of 30.23.

Taste Testing

A panel of cola experts tasted the lemon/lime flavored cola drinks made according to Example 1 and Comparative Example 1 immediately upon manufacture, i.e., fresh beverages. The experts adjudged the drinks of Example 1 to be more tart. Seven months after manufacture, a panel of cola experts re-evaluated the cola drinks made according to Example 1 and Comparative Example 1. The experts unanimously found that the flavors in the drinks of Comparative Example 1 had decomposed significantly, rendering the drink quality unacceptable. On the contrary, the drinks according to Example 1 were judged as more tart and had acceptable flavor and taste.

A panel of lemon/lime flavored carbonated soft drink experts tasted 4-week old drinks made according to Example 2 and Comparative Example 2. The experts adjudged the drinks of Example 2 to be more tart and have a stronger lemon/lime taste.

Other variations and modifications of this invention will be obvious to those skilled in this art. This invention is not to be limited except as set forth in the following claims.

What is claimed is:

1. A method comprising:
   (a) including in a lemon/lime flavored beverage an acidulant system consisting of (i) citric acid in an amount from about 0.18 to about 0.24% by weight of the finished lemon/lime flavored beverage and (ii) adipic acid having a smaller dissociation constant than citric acid; and
   (b) increasing the pH of the lemon/lime flavored beverage by up to about 0.7 pH units until the beverage has a pH between about 3.2 and about 3.8 at the time of manufacture by including in the lemon/lime flavored beverage a buffer salt system consisting of a citrate salt and a phosphate salt, wherein the ratio by weight of said adipic acid:said citric acid is 1:15 to 1:3, and wherein for at least four weeks following manufacture the beverage is more tart and has a stronger lemon/lime taste than a beverage having the same amount of lemon flavoring and a pH of at least about 3.0 and without said ratio of acids.

2. The method of claim 1, wherein the ratio by weight of the adipic acid:citric acid is 1:10 to 1:4.

3. The method of claim 1, wherein the citrate salt and the phosphate salt are present in a combined amount of about 0.04-0.18% by weight of finished lemon/lime flavored beverage.

4. The method of claim 3, wherein the citrate salt and the phosphate salt are present in a combined amount of about 0.05-0.15% by weight of finished lemon/lime flavored beverage.

5. The method of claim 1, wherein the lemon/lime flavored beverage is a lemon/lime flavored carbonated soft drink.

6. The method of claim 1, wherein the lemon/lime flavored beverage is a lemon/lime flavored cola beverage.

7. A method comprising:
(a) including in a lemon/lime flavored beverage an acidulant system consisting of (i) a combination of phosphoric acid and citric acid and citric acid in an amount from about 0.18 to about 0.24% by weight of the finished lemon/lime flavored beverage and (ii) adipic acid having a smaller dissociation constant than both phosphoric acid and citric acid; and
(b) increasing the pH of the lemon/lime flavored beverage by up to about 0.7 pH units until the beverage has a pH between about 3.2 and about 3.8 at the time manufacture by including in the lemon/lime flavored beverage a buffer salt system consisting of a citrate salt and a phosphate salt, wherein the ratio by weight of said adipic acid:said phosphoric acid:said citric acid is 3.0-4.0:1.4-2.0:1.0, and wherein for up to seven months following manufacture the beverage is more tart and has a stronger lemon/lime flavor and taste than a beverage having the same amount of lemon flavoring and a pH of at least about 2.7 and without said ratio of acids.

8. The method of claim 7, wherein the ratio by weight of the adipic acid:phosphoric acid:citric acid is 3.3-3.7:1.6-1.8:1.0.

9. The method of claim 7, wherein the citric acid is present in an amount from about 0.19-0.23% based on finished lemon/lime flavored beverage weight.

10. The method of claim 7, wherein the citrate salt and the phosphate salt are present in a combined amount of about 0.25-0.41% by weight of finished lemon/lime flavored beverage.

11. The method of claim 10, wherein the citrate salt and the phosphate salt are present in a combined amount of about 0.3-0.36% by weight of finished lemon/lime flavored beverage.

12. The method of claim 7, wherein the lemon/lime flavored beverage is a lemon/lime flavored cola beverage.

13. The method of claim 7, wherein the lemon/lime flavored beverage is a lemon/lime flavored carbonated soft drink.

14. The method of claim 1 or claim 7, wherein the citrate salt and the phosphate salt are independently selected from the group consisting of sodium, potassium and calcium salts.

15. The method of claim 1 or claim 7, wherein the citrate salt and the phosphate salt are independently selected from the group consisting of mono-, di- and tri-ionic salts.

16. The method of claim 1 or claim 7, wherein the ratio by weight of citrate salt:phosphate salt is from 1:2 to 2:1.

17. The method of claim 1, wherein the ratio by weight of citrate salt:phosphate salt is 1:1.

* * * * *

UNITED STATES PATENT AND TRADEMARK OFFICE
CERTIFICATE OF CORRECTION

| | | |
|---|---|---|
| PATENT NO. | : 7,572,471 B2 | Page 1 of 1 |
| APPLICATION NO. | : 10/628420 | |
| DATED | : August 11, 2009 | |
| INVENTOR(S) | : Lee et al. | |

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by 440 days Delete the phrase "by 440 days" and insert -- by 674 days --

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,572,471 B2  Page 1 of 1
APPLICATION NO. : 10/628420
DATED : August 11, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 908 days.

Signed and Sealed this

Seventh Day of September, 2010

David J. Kappos
*Director of the United States Patent and Trademark Office*